United States Patent [19]

Michels

[11] 3,917,003
[45] Nov. 4, 1975

[54] ROTARY ROD WEEDER ATTACHMENT FOR GRAIN PLANTING DRILLS AND THE LIKE

[76] Inventor: Frank C. Michels, Beach, N. Dak.

[22] Filed: Dec. 12, 1973

[21] Appl. No.: 426,664

[52] U.S. Cl.................................. 172/44; 111/68
[51] Int. Cl.² .................................... A01B 39/19
[58] Field of Search .............. 172/44, 125; 111/68

[56] References Cited
UNITED STATES PATENTS

| 3,101,786 | 8/1963 | Hunter et al. | 172/125 X |
| 3,135,338 | 6/1964 | Morris | 172/44 |
| 3,190,363 | 6/1965 | Morris | 172/44 |
| 3,360,053 | 12/1967 | Doepker | 172/44 |
| 3,576,213 | 4/1971 | Hall | 172/44 |
| 3,661,101 | 5/1972 | Parsons | 111/69 |

Primary Examiner—Edgar S. Burr
Assistant Examiner—Paul T. Sewell
Attorney, Agent, or Firm—Orrin M. Haugen

[57] ABSTRACT

This is a rotary rod weeder attachment for farm planters which is particularly designed to prepare the seed bed immediately ahead of the disc openers on the planting drill. This rod weeder is vertically adjustable and releases in a vertical direction upon impact with imbedded obstructions in the field.

4 Claims, 5 Drawing Figures

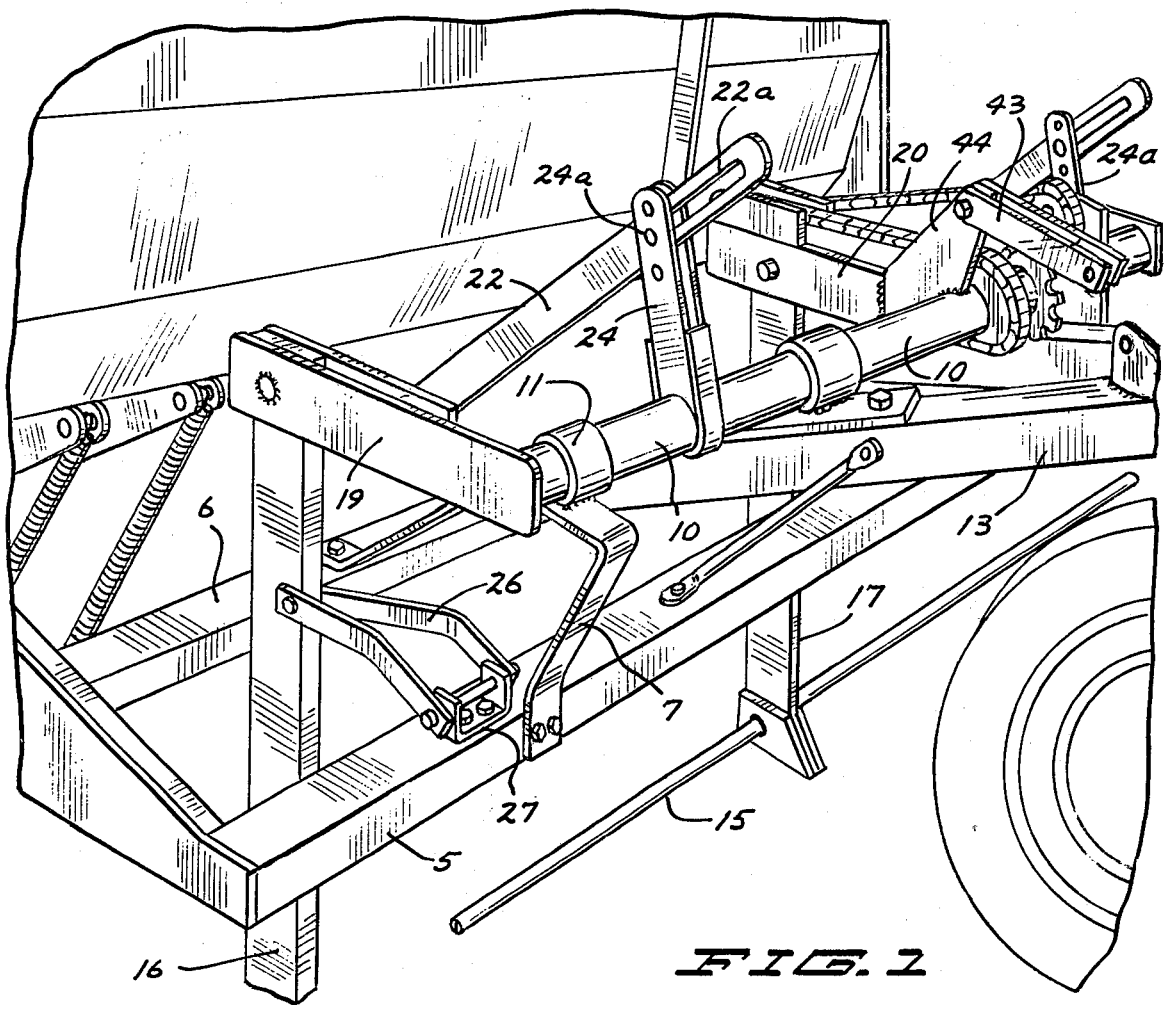
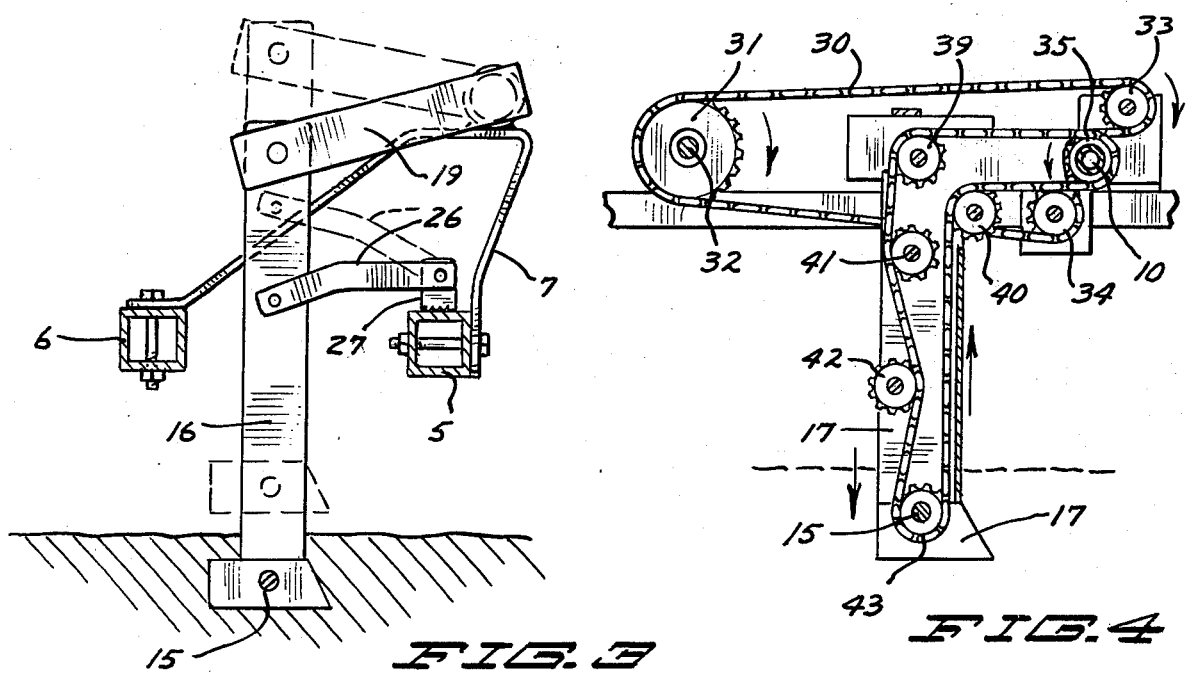

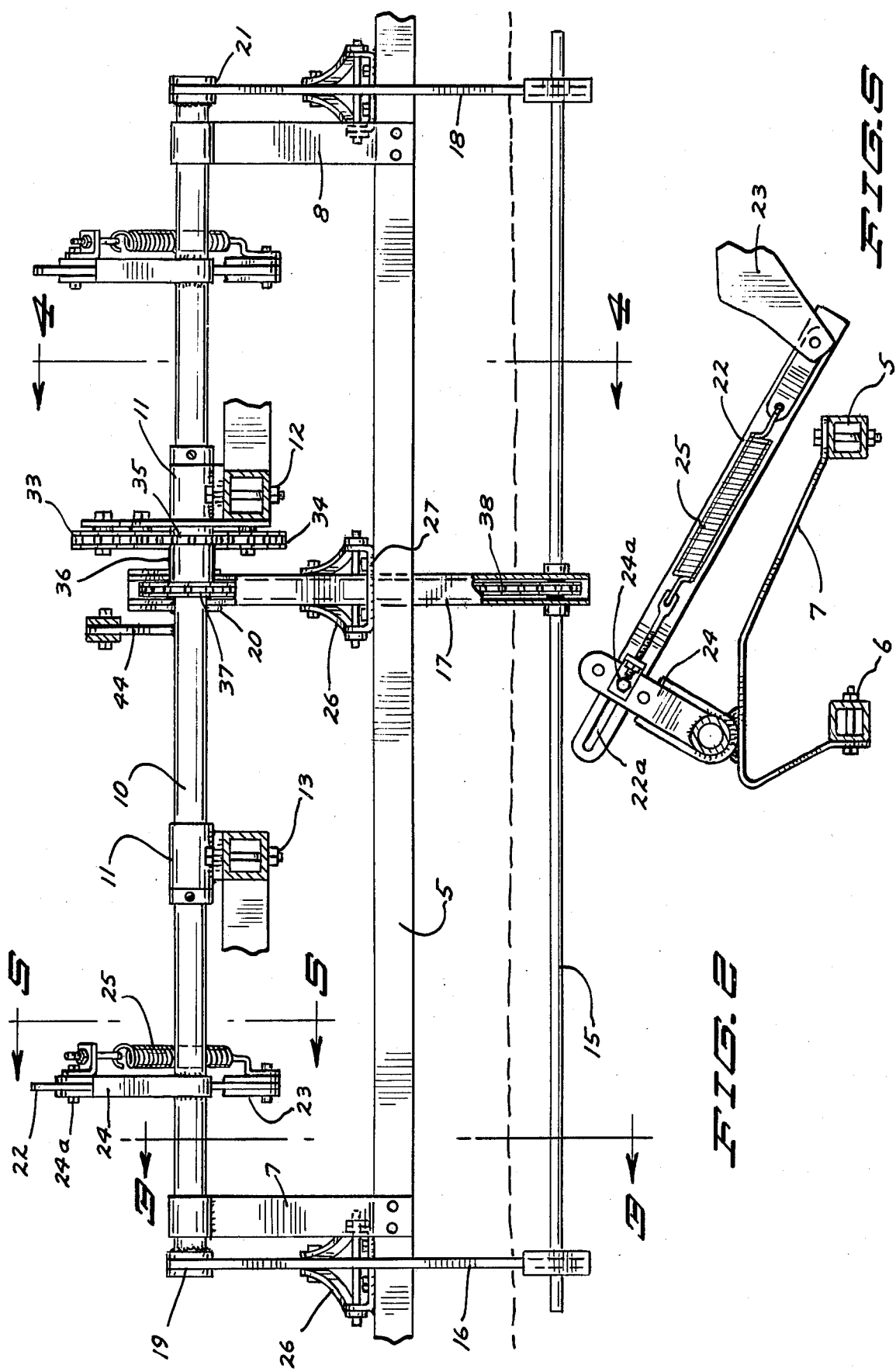

ROTARY ROD WEEDER ATTACHMENT FOR GRAIN PLANTING DRILLS AND THE LIKE

A number of rotary rod weeders have been previously invented such as the rod weeders disclosed in U.S. letters Patents to Parsons, No. 3,661,101 and to Mowbray, No. 2,892,504 however, none of these embody the advantages of my invention.

It is an object of the present invention to provide a rotary rod weeder specifically designed to retract vertically upon impact against a solid obstruction such as a rock or the like imbedded in the field being weeded.

It is another object to provide a rotary rod weeder attachment for a planting drill machine which can be quickly and easily attached to the machine immediately ahead of the trenching discs to provide a compact unit which is vertically adjustable with the drill assembly and also is independently vertically adjustable.

These and other objects and advantages of this invention will more fully appear from the following description made in connection with the accompanying drawings in which like reference characters refer to similar parts throughout the several views, and, in which:

FIG. 1 is a fragmentary perspective view of a conventional grain planting drill with my rotary rod weeder mounted thereon;

FIG. 2 is a front elevational view of the weeder structure shown in FIG. 1;

FIG. 3 is a vertical sectional view taken substantially along the line 3—3 of FIG. 2;

FIG. 4 is a fragmentary sectional view showing the drive mechanism as viewed from the section line 4—4 of FIG. 2; and, FIG. 5 is a fragmentary sectional view taken substantially along the line 5—5 of FIG. 2.

A conventional grain planting machine having a pair of cross frame members 5 and 6 is illustrated in FIG. 1. A pair of main mounting brackets 7 and 8 are fixed to the members 5 and 6. A bell crank mounting shaft 10 is journaled in the brackets 7 and 8 and extends across the front of the planting machine. A pair of bearings 11 are mounted on longitudinal frame members 12 and 13 of the machine.

A rotary weeder rod 15 is supported by three depending strut members 16, 17 and 18. These strut members are respectively mounted on supporting bell crank mounting arms 19, 20 and 21, each of which is fixed to the bell crank shaft 10.

A pair of spring loaded hold-down links 22 are pivotally mounted at their rear ends on suitable frame members 23 of the planter. A slot 22a is provided in the forward end portion of each of the links 22 and a bell crank 24 fixed to the shaft 10 is connected to each of the links by the sliding pin 24a as best shown in FIG. 5. A hold-down spring is provided for each of the bell crank arms 24 and is designated by the numeral 25. Each of the members 16, 17 and 18 has a stabilizing link structure 26 pivotally connected at one end to an intermediate portion thereof. The other end of each link structure 26 is pivotally mounted on the frame member 5 as by a bracket member 27 as best shown in FIG. 1.

The driving mechanism for the rod 15 is best illustrated in FIG. 4 and includes a drive chain 30 trained about a sprocket wheel 31 mounted on the rotary jack shaft 32 of the grain planter mechanism. The chain 30 passes forwardly from sprocket wheel 31 to a pair of forwardly disposed sprockets 33 and 34 spaced apart with a reversing sprocket 35 disposed therebetween. A connecting sleeve 36 is journaled on the cross shaft 10 as best shown in FIG. 2 and is fixed to sprocket 35 for rotation therewith. A driven sprocket 37 is connected to said sleeve 36 and is driven thereby. A second drive chain 38 is trained about sprockets 37, 39, 40, 41, 42, and 43 to drive the rod 15 in a rotary direction opposite to the direction of rotation of the wheels of the planter machine and the depending portion of the drive chain 38 is enclosed within a housing formed by strut 17.

The crank arms 19, 20 and 21 combine with the stabilizing links 26 to provide a parallelogram structure which produces vertical up and down movement of the struts 16, 17 and 18 when the shaft 10 is oscillated. Each of the crank arms 24 have three connection holes formed in the upper portions thereof to permit adjustment of the normal operative vertical position of the struts 16, 17 and 18. The springs 25 releasably hold said struts in the adjusted position and the rod 15 is thus located at the desired depth below the surface of the ground, as best shown in FIGS. 3 and 4. When the rod 15 or the lower end of one of the strut members strikes an object in the ground the force thus applied will cause said strut members to be lifted vertically against the force of the springs 25. A suitable retracting link 43 is connected to the shaft 10 as by a bell crank member 44 and the forward end thereof is connected to the frame member 13 of the vehicle as best shown in FIG. 1 when the rod and struts are to be elevated into inoperative retracted position when not in use. In most seed planter machines the frame structure on which the planting mechanism is mounted is also vertically adjustable and, of course, my rod and drive assembly being mounted on the frame of the planter unit, is vertically adjustable therewith.

The vertical up and down movement of the strut members permits the same to be mounted in close proximity to the trenchers of the planting drill thus producing a compact operating unit. The vertical retraction of the struts and rod 15 against the force of the springs 25 when a ground obstruction is encountered during the weeding operation also permits said rod and strut assembly to be positioned close to the trenchers of the planter since no clearance is required for the weeding rod and strut to swing back as is necessary with prior art units.

It will be seen that I have procided an extremely simple and compact rotary rod weeder for easy attachment to a conventional farm planter such as the planting drill portions of which are illustrated and disclosed herein. The vertical up and down movement of the rod supporting struts and the spring release mechanism for retracting the same upon impact against a ground obstruction are important features of this invention. The rotation reversing drive mechanism is also a relatively simple and compact unit which permits easy attachment to the farm planter.

It will, of course, be understood that various changes may be made in the form, details, arrangement and proportions of the parts without departing from the scope of this invention as set forth in the appended claims.

What is claimed is:

1. A rotary rod weeder attachment adapted for mounting upon a wheeled vehicle chassis and comprising a frame means, a plurality of elongated vertical strut members each having an elongated axis extending along said elongated dimension, said struts being mounted for rockable substantially axially up and down vertical movement on said frame means, and strut mounting means securing said strut members to said frame means and to said vehicle chassis,
  a. a rotatable weeder rod journaled at the lower ends of said strut members and supported thereby,
  b. rotary driving means connected with said weeder rod for driving the same,
  c. spring means for normally holding said strut members in downwardly projected operative position but yielding upon impact against the rod or strut members to accommodate retraction thereof in response to unyielding impact,
  d. said strut mounting means comprising a bell crank supporting structure at the upper end thereof with angularly disposed arms extending rearwardly from a first pivot point and with said supporting structure being pivotally mounted at the top of said strut members with yieldable spring means for normally yieldably holding said strut members in downwardly projected operative position, and stabilizing arms disposed intermediate the ends of said strut members and in substantially parallel relation to said bell crank supporting structure and being pivotally coupled to said strut members and to said frame means at a second pivot point spaced from said first pivot point to produce a parallelogram support structure for each of said strut members and thus produce substantially vertical rockable up and down movement thereof about said spaced first and second pivot points against the force of impact by the forward surfaces of said strut members and rod against an unyielding obstruction in the ground being weeded.

2. The structure set forth in claim 1 and adjusting means for varying the elevation of the downwardly projected position of said strut members and said rotary rod.

3. The structure set forth in claim 1 and the rod driving means including a reversing mechanism for rotating said rod axially in a direction opposite to the direction of rotation of the wheels of the vehicle.

4. The structure set forth in claim 3 and said reversing mechanism including a pair of spaced-apart driving sprockets with a reversing sprocket interposed therebetween, the reversing sprocket engaging the driving chain on the opposite side thereof from said spaced-apart sprocket wheels, and a chain and sprocket drive connected with said reversing sprocket and connected to said rod for driving the same.

* * * * *